United States Patent
Guo et al.

(10) Patent No.: US 6,713,539 B2
(45) Date of Patent: Mar. 30, 2004

(54) STORAGE-STABLE MODIFIED ASPHALT COMPOSITION AND ITS PREPARATION PROCESS

(75) Inventors: Shuhua Guo, Beijing (CN); Weiqi Huang, Beijing (CN); Jun Long, Beijing (CN); Baichun Zhang, Beijing (CN); Zijun Wang, Beijing (CN); Yucheng She, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 193 days.

(21) Appl. No.: 09/931,846

(22) Filed: Aug. 17, 2001

(65) Prior Publication Data

US 2002/0068776 A1 Jun. 6, 2002

(30) Foreign Application Priority Data

Aug. 18, 2000 (CN) ........................................ 00123512 A
Aug. 18, 2000 (CN) ........................................ 00123513 A

(51) Int. Cl.[7] ............................................. C08L 95/00
(52) U.S. Cl. .............................. 524/68; 524/59; 524/70
(58) Field of Search ................................. 524/59, 68, 70

(56) References Cited

U.S. PATENT DOCUMENTS

| | | | |
|---|---|---|---|
| 5,306,750 A | 4/1994 | Goodrich et al. | 524/59 |
| 5,331,028 A | 7/1994 | Goodrich | 524/59 |
| 5,336,705 A | 8/1994 | Gorbaty et al. | 524/68 |
| 5,348,994 A | 9/1994 | Gorbaty et al. | 524/68 |
| 5,627,225 A | 5/1997 | Gorbaty et al. | 524/71 |
| 5,990,206 A * | 11/1999 | Tanaka et al. | 524/59 |

FOREIGN PATENT DOCUMENTS

| | | |
|---|---|---|
| EP | 0639630 A1 | 2/1995 |
| EP | 0639630 B1 | 4/1998 |

OTHER PUBLICATIONS

Petrolite Corporation v. Watson, Coms. Pats. (DC DC) 113 USPQ 248, Mar. 13, 1957.*
Austenal Laboratories, Incorporated v. Nobilum Processing Company of Chicago (DC NIII) 115 USPQ 44, Jun. 5, 1957.*
Teh Fu Yen, et al. (1994) "Multiple Structural Orders of Asphaltenes", *Asphaltenes and Asphalts, I. Developments in Petroleum Science 40* pp. 111–123.

* cited by examiner

Primary Examiner—Peter Szekely
(74) Attorney, Agent, or Firm—Scully, Scott, Murphy & Presser

(57) ABSTRACT

A storage-stable modified asphalt composition, which comprises: 50–97.7 parts by weight of a base asphalt, 2.0–20.0 parts by weight of a polymer having double bonds, 0.1–20.0 parts by weight of a compatibilizer, 0.1–10.0 parts by weight of a cross-linking reagent, and 0.1–10.0 parts by weight of a organic polar compound, and the softening point difference of its product determined by the stability test is lower than 2.5° C. The process for preparing said modified asphalt composition is mixing 50–97.7 parts by weight of a base asphalt, 2.0–20.0 parts by weight of a polymer having double bonds, 0.1–20.0 parts by weight of a compatibilizer 0.1–10.0 parts by weight of a cross-linking reagent, and 0.1–10.0 parts by weight of a organic polar compound under certain conditions. The modified asphalt provided by the present invention has good storage-stability. The preparation process provided by the present invention is simple, and there is no need for special apparatus.

34 Claims, 1 Drawing Sheet

STORAGE-STABLE MODIFIED ASPHALT COMPOSITION AND ITS PREPARATION PROCESS

FIELD OF THE INVENTION

The present invention is related to an asphalt composition and its preparation process. More particularly, it is related to a storage-stable polymer-modified asphalt composition and its preparation process.

DESCRIPTION OF THE PRIOR ART

Asphalt materials have rapidly developed as paving and decorating materials in the road and architecture sectors. However, the optimum performance properties of asphalt and its blend such as viscoelasticity, plasticity, adhesiveness, etc. can not exert since they are affected by many factors. Among various factors, climate is the most important one. In the season of high temperature, summer, ruts caused by racing vehicles on express highways are the major factor leading to the damage of the road surface. In winters, fractures on the road surface resulted from the abruptly change of the temperature are the major causes for the transverse crack. In the rain seasons in the south, the intrusion of the rainwater leads to the interaction of asphalt with the blend material at the interface, thereby lowering the adhesive performance of asphalt and making it easy for asphalt to strip from the stones. Therefore, it is necessary to improve the Theological property of asphalt. Addition of a polymer is an effective way to improve the performance of asphalt. Addition of a polymer can enhance the viscosity and high temperature resistance, lower the low temperature sensibility, and improve the low temperature performance at the same time.

Asphalt modified by olefin polymers is reviewed in T. F. Yen, et al., *Asphaltenes and Asphalts, I Developments in Petroleum Science*. The amount of the polymers is 6 wt %, and the stability of asphalt modified by various polymers is shown in Table 1.

TABLE 1

| Polymer type | | None | APP | LDPE | EPDM | SBS |
|---|---|---|---|---|---|---|
| Penetration (25° C., 100 g, 5 s), dmm | | 133 | 145 | 41 | 50 | 72 |
| Softening point (ring-and-ball), ° C. | | 44 | 47 | 98 | 66 | 98 |
| Stability test (163° C., 48 h) | Top softening point, ° C. | — | 55 | >100 | 87 | >100 |
| | Bottom softening point, ° C. | — | 45 | 52 | 52 | 61 |
| | Softening point difference, ° C. | — | 10 | >50 | 35 | >40 |

It can be seen from Table 1 that when APP (atactic polypropylene), LDPE (low density polyactene), EPDM (ethylenepropylene-diene ternary copolymer), SBS (styrene-butadiene-styrene three-block copolymer) are added to asphalt respectively, phase separation takes place between most of the polymers and asphalt, thus directly affecting the performance properties of the asphalt-polymer compositions.

EP 639630A1 discloses a process for preparing stable asphalt-polymer compositions, wherein a raw asphalt with a certain constitution is first screened as the raw material of the modified asphalt, and then reacted with the three block polymer SBS as a polymer modifier and a vinyl aromatic (such as styrene) as an assistant added thereto in an inert environment to yield a sample with good stable performance. There is a limit to the source of the raw material of the modified asphalt in this process, and styrene as an assistant is of no help in the dispersion of SBS in asphalt. In addition, the reaction cost increases since a nitrogen environment is needed.

U.S. Pat. Nos. 5,336,705, 5,627,225, and 5,348,994 first use fuming sulfuric acid or other sulfonating reagent to sulfonate the raw asphalt and the polymer modifier to incorporate acidic groups into both of them, and then neutralize with alkalis such as CaO, ZnO, etc. as neutralization reagents. This process prolongs the preparation process, increases the production cost, and results in corrosion of the apparatus by sulfonating reagents.

U.S. Pat. No. 5,306,750 discloses a process for reacting a polymer with asphalt, and a polymer-linked-asphalt product. This process is to covalently react 0.05–2 wt % of an epoxide-containing polymer with asphalt at a temperature above 100° C. for longer than 1 h. No phase separation happened with the modified asphalt obtained by this process after storing in a drying oven at 163° C.–177° C. for 4 days.

U.S. Pat. No. 5,331,028 discloses a polymer-modified asphalt composition and its preparation process. The constitution of the composition is that the reaction product derived by the reaction between 100 parts by weight of asphalt and 0.5–11 parts by weight of an ethylene copolymer containing glycidyl accounts for 80–99.7 wt %, and that the styrene/conjugated diene block copolymer accounts for 0.3–20 wt %. The process is to mix 70–99.2 wt % of asphalt, 0.5–10 wt % of the ethylene copolymer containing glycidyl, and 0.3–20 wt % of a styrene/conjugated diene block copolymer, and to react at 170° C.–220° C. for 6–36 h to yield a reaction product.

Although the compatibility of the polymer with asphalt used in U.S. Pat. Nos. 5,331,028 and 5,306,750 is rather good, the high preparation cost of the polymer and the difficulty in reaction are the major control factors.

One of the objectives of the present invention is to provide a storage-stable modified asphalt composition.

Another objective of the present invention is to provide a process for preparing the storage-stable modified asphalt composition.

SUMMARY OF THE INVENTION

The present invention provides a storage-stable modified asphalt composition, which comprises:

| | |
|---|---|
| base asphalt | 50–97.7 parts by weight; |
| polymer having double bonds | 2.0–20.0 parts by weight; |
| compatibilizer | 0.1–20.0 parts by weight; |
| cross-linking reagent | 0.1–10.0 parts by weight; |
| organic polar compound | 0.1–10.0 parts by weight; | and the softening point difference of its product determined by the stability test is lower than 2.5° C.

The present invention also provides a process for preparing the storage-stable modified asphalt composition, which comprises mixing 50–97.7 parts by weight of a base asphalt, a 2.0–20.0 parts by weight of a polymer having double bonds, 0.1–20.0 parts by weight of a compatibilizer, 0.1–10.0 parts by weight of a cross-linking reagent, and 0.1–10.0 parts by weight of a organic polar compound under certain conditions.

DETAILED DESCRIPTION OF THE INVENTION

The present invention provides a storage-stable modified asphalt composition, which comprises:

| base asphalt | 50–97.7 parts by weight; |
| --- | --- |
| polymer having double bonds | 2.0–20.0 parts by weight; |
| compatibilizer | 0.1–20.0 parts by weight; |
| cross-linking reagent | 0.1–10.0 parts by weight; |
| organic polar compound | 0.1–10.0 parts by weight; | and the softening point difference of its product determined by the stability test is lower than 2.5° C.

Said base asphalt is one selected from the group consisting of petroleum asphalts, coal-tar asphalts, tar sand asphalts and native asphalts, or a mixture thereof, wherein the petroleum asphalt is one selected from the group consisting of straight-run asphalts, asphalts obtained by solvent deasphalting, oxidized asphalts, and blended asphalts, or a mixture thereof. Said straight-run asphalt is an atmospheric residue or vacuum residue obtained through atmospheric distillation or vacuum distillation, the Penetration of which at 25° C. is 20–300 dmm (i.e. 1/10mm). Said asphalt obtained by solvent deasphalting is a deoiled asphalt obtained by extracting a residue with one of the $C_3$–$C_5$ hydrocarbons or their mixtures. The Penetration of the deoiled asphalt at 25° C. is 5–200 dmm.

Said polymer having double bonds is a block polymer of styrene-butadiene in a ratio of 20–45:80–55 which mainly refers to the SBS type. The structure of SBS is star or linear, the molecular weight of which is in the range of 100,000 to 350,000. The block polymer can be either a dry rubber, or an oil-extended polymer wherein 2–60 wt % weight of oil is extended.

Said compatibilizer is one selected from the group consisting of styrene tar, tall oil, acid-containing tall oil, catalytically cracked oil slurry, heavy deasphalted oil, extracted oil obtained by solvent refining, naphthenic acid, naphthenic oil, white oil, and coal tar fractions, or a mixture thereof.

Said cross-linking reagent is one selected from the group consisting of crystallized sulfurs, activated sulfurs, sulfur-donors, and "symbolizing" sulfur-donating cross-linking reagents, or a mixture thereof. Said activated sulfur is a sulfur powder, a colloidal sulfur, or a mixture thereof. Said colloidal sulfur is a colloid with an average diameter of 1–5 μm prepared by mixing sulfur powder or precipitated sulfur with a dispersion reagent and then grinding. The sulfur donor is one selected from the group consisting of sulfur-containing morpholinium compounds, thiuram compounds, and polysulfides, or a mixture thereof.

The general formula of the thiuram compounds is:

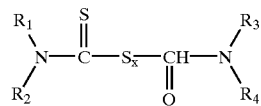

wherein x=1–4, $R_1$, $R_2$, $R_3$, and $R_4$: a $C_1$–$C_4$ alkyl.

Polysulfides: $R_1$—$(S)_n$—$R_2$, $R_1$, $R_2$ is a aliphatic or aromatic heterocyclic group, such as cycloheptathiaimine alkylphenol, alkylphenol monosulfide.

Said "symbolizing" sulfur-donating cross-linking reagent mainly refers to a metal oxide cross-linking reagent, wherein the metal manly refers to a divalent metal such as Ca, Mg, Zn or Pb, etc. Said "symbolizing" sulfur-donating cross-linking reagent is one selected from the group consisting of CaO, MgO, ZnO, and PbO, or a mixture thereof.

Said organic polar compound mainly refers to a compound with polar groups, which is one selected from the group consisting of amine, acid, phenolic resin and aldehyde compounds, or a mixture thereof Said amine compounds mainly refer to aliphatic amine and aromatic amine compounds which is one selected from polyactene polyamine compounds, wherein the polyactene comprises di-, tri- and tetraethylene; and the polyamine comprises hexamethylene diamine, tetramine, penta-amine, or a mixture thereof.

Said acid compound is one selected from the group consisting of carboxylic acid, acid anhydride, sulfonic acid, boric acid, and phosphoric acid compounds, or a mixture thereof.

Said carboxylic acid compound is one selected from the group consisting of aliphatic acids and aromatic acids, or a mixture thereof.

Said acid anhydride compounds are phthalic anhydride and its derivatives or maleic anhydride and its derivatives.

The general formula of said sulfonic compounds is:

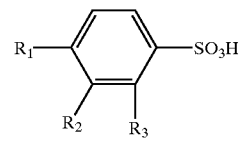

wherein $R_1$, $R_2$, and $R_3$H or a $C_1$–$C_5$ alkyl.

Said phosphoric acid compound is one selected from polyphosphoric acid, phosphorous acid, modified polyphosphoric acid, and phosphate compounds, or a mixture thereof.

Said phenolic resin compound is one selected from formaldehyde alkylphenol resin compounds, wherein the alkyl is p-tert-butyl or p-tert-octyl paraffinic group. The polar hetero-atom containing alkyl is also desired, wherein said formaldehyde alkylphenol resin comprises formaldehyde phenol resin having sulfur or oxygen atom containing alkyl.

Said aldehyde compound is one selected from glycidic aldehyde, formaldehyde, binary aldehydes, and furfural, or a mixture thereof, wherein the binary aldehydes are p-phthalic aldehyde and its derivatives or m-phthalic aldehyde and its derivatives.

The present invention also provides the process for preparing a storage-stable modified asphalt composition, which comprises: mixing 50–97.7 parts by weight of a base asphalt, 2.0–20.0 parts by weight of a polymer having double bonds, 0.1–20.0 parts by weight of a compatibilizer, 0.1–10.0 parts by weight of a cross-linking reagent, and 0.1–10.0 parts by weight of a organic polar compound under certain conditions.

Said compatibilizer can be first mixed with the base asphalt, or with the polymer having double bonds, or with the mixture of the polymer having double bonds and the base asphalt; or said compatibilizer can be added at last, said compatibilizer can be added either once or twice. Said base asphalt can also be added either once or twice.

Mixing of various components can be static, dynamic, grinding, or vigorous stirring.

The process provided by the present invention will be illustrated below with four embodiments, but the process provided by the present invention is not limited to the three embodiments.

Embodiment 1:

The process provided by the present invention comprises the following steps:

(1) contacting the base asphalt with the compatibilizer at 100° C.–250° C. for 0.1–6 h to yield the treated base asphalt;

(2) mixing the treated base asphalt with the polymer having double bonds for 0.1–10 h to yield the asphalt mother liquor, (3) adding the cross-linking reagent, organic polar compound, and optional base asphalt to the asphalt mother liquor at 100° C.–250° C. to react for 5–300 min, yielding the modified asphalt composition.

In this embodiment, said base asphalt, polymer having double bonds, compatibilizer, cross-linking reagent, and organic polar compound account for 50–97.7 parts by weight, 2.0–20.0 parts by weight, 0.1–20.0 parts by weight, 0.1–10.0 parts by weight, and 0.1–10.0 parts by weight of the modified asphalt composition, respectively. The weight ratio of the base asphalt in step (3) to that in step (1) is 0–50:100–50.

Embodiment 2:

The process provided by the present invention comprises the following steps:

(1) contacting the base asphalt with the compatibilizer at 100° C.–250° C. for 0.1–6 h to yield the treated base asphalt;

(2) mixing the treated base asphalt with the polymer having double bonds for 0.1–10 h to yield the asphalt mother liquor, (3) adding the cross-linking reagent, organic polar compound, and optional compatibilizer to the asphalt mother liquor at 100° C.–250° C. to react for 5–300 min, yielding the modified asphalt composition.

In this embodiment, said base asphalt, polymer having double bonds, compatibilizer cross-linking reagent, and organic polar compound account for 50–97.7 parts by weight, 2.0–20.0 parts by weight, 0.1–20.0 parts by weight, 0.1–10.0 parts by weight, and 0.1–10.0 parts by weight of the modified asphalt composition. The weight ratio of the compatibilizer in step (3) to that in step (1) is 0–50:100–50.

Embodiment 3:

The process provided by the present invention comprises the following steps:

(1) mixing the base asphalt at 100° C.–250° C. with the polymer having double bonds for 0.1–10 h to yield the asphalt mother liquor;

(2) contacting the asphalt mother liquor at 100° C.–250° C. with the compatibilizer at 100–250° C. for 0.1–6 h to yield the treated asphalt mother liquor;

(3) adding the cross-linking reagent, organic polar compound, and the optional base asphalt to the treated asphalt mother liquor to react for 5–300 min, yielding the modified asphalt composition.

In this embodiment, said base asphalt, polymer having double bonds, compatibilizer, cross-linking reagent, and organic polar compound account for 50–97.7 parts by weight, 2.0–20.0 parts by weight, 0.1–20.0 parts by weight, 0.1–10.0 parts by weight, and 0.1–10.0 parts by weight of the modified asphalt composition, respectively. The weight ratio of the base asphalt in step (3) to that in step (1) is 0–50:100–50.

Embodiment 4:

The process provided by the present invention comprises the following steps:

(1) contacting 2.0–20.0 parts by weight of a polymer having double bonds with 0.1–20.0 parts by weight of a, compatibilizer at 10° C.–250° C. for 0.1–72 h to yield the treated polymer having double bonds;

(2) heating 50–97.7 parts by weight of the base asphalt to 100° C.–250° C.;

(3) mixing the treated polymer having double bonds with the heated base asphalt for 0.1–6.0 h to yield an asphalt mother liquor, and maintaining the temperature of the asphalt mother liquor at 100° C.–250° C.;

(4) adding 0.1–10.0 parts by weight of the cross-linking reagent and 0.1–10.0 parts by weight of the organic polar compound into the asphalt mother liquor to react for 5–300 min, yielding the modified asphalt composition.

Said base asphalt in the aforesaid process is one selected from the group consisting of petroleum asphalts, coal-tar asphalts, tar sand asphalts and native asphalts, or a mixture thereof, wherein the petroleum asphalt is one selected from the group consisting of straight-run asphalts, asphalts obtained by solvent deasphalting, oxidized asphalts, and blended asphalts, or a mixture thereof The straight-run asphalt is an atmospheric residue or vacuum residue obtained through atmospheric distillation or vacuum distillation, the Penetration of which at 25° C. is 20–300 dmm (i.e. $\frac{1}{10}$ mm). The asphalt obtained by solvent deasphalting is a deoiled asphalt obtained by extracting a residue with one of the $C_3$–$C_5$ hydrocarbons or their mixtures. The Penetration of the deoiled asphalt at 25° C. is 5–200 dmm.

Said polymer having double bonds is a block polymer of styrene-butadiene in a ratio of 20–45:80–55, which mainly refers to the SBS polymers. The structure of the SBS is the star or linear, the molecular weight of which is in the range of 100,000 to 350,000. The block polymer can be either a dry rubber, or an oil-extended polymer wherein 2–60 wt % of oil is extended.

Said compatibilizer is one selected from the group consisting of styrene tar, tall oil, acid-containing tall oil, catalytically cracked oil slurry, heavy deasphalted oil, extracted oil obtained by solvent refining, naphthenic acid, naphthenic oil, white oil, and coal tar fractions, or a mixture thereof.

The addition of the compatibilizer into the system can enhance the compatibility of the polymer in asphalt. Since the compatibilizer itself has good intersolubility with both the polymer and asphalt, it can increase the compatibility with both.

Said cross-linking reagent is one selected from the group consisting of crystallized sulfurs, activated sulfurs, sulfur-donors, and "symbolizing" sulfur-donating cross-linking reagents, or a mixture thereof Said activated sulfur is a sulfur powder, a colloidal sulfur, or a mixture thereof. Said colloidal sulfur is a colloid with an average diameter of 1–5 $\mu$m prepared by mixing sulfur powder or precipitated sulfur with a dispersion reagent and then grinding. The sulfur donor is one selected from the group consisting of sulfur-containing morpholinium compounds, thiuram compounds, and polysulfides, or a mixture thereof.

The general formula of the thiuram type compounds is:

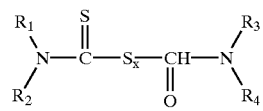

wherein x=1–4, $R_1$, $R_2$, $R_3$, and $R_4$: a $C_1$–$C_4$ alkyl.

Polysulfides: $R_1$—$(S)_n$—$R_2$, $R_1$, $R_2$ is a aliphatic or aromatic heterocyclic group, such as cycloheptathiaimine alkylphenol, alkylphenol monosulfide.

The "symbolizing" sulfur-donating cross-linking reagent mainly refers to a metal oxide cross-linking reagent, wherein the metal manly refers to a divalent metal such as Ca, Mg, Zn, Pb, etc. Said "symbolizing" sulfur-donating cross-linking reagent is one selected from one of the group consisting of CaO, MgO, ZnO, and PbO, or a mixture thereof.

The addition of the cross-linking reagent during the mixing of the asphalt/polymer mother liquor permits the polymer in a good dispersion state to carry out the linking reaction with the organic polar compound in asphalt. Thus the polymer can exist in a stable network structure, and the further aggregation and stability of the polymer are prevented Said organic polar compound mainly refers to a compound with polar groups, which is one selected from the group consisting of amine, acid, phenolic resin and aldehyde compounds, or a mixture thereof Said amine compounds mainly refer to aliphatic amine and aromatic amine compounds which is one selected from polyactene polyamine compounds, wherein the polyactene comprises di-, tri- and tetraethylene; and the polyamine comprises hexamethylene diamine, tetramine, penta-amine, or a mixture thereof.

Said acid compound is one selected from the group consisting of carboxylic acid, acid anhydride, sulfonic acid, boric acid, and phosphoric acid compounds, or a mixture thereof.

Said carboxylic acid compound is one selected from the group consisting of aliphatic acids and aromatic acids, or a mixture thereof.

Said acid anhydride compounds are phthalic anhydride and its derivatives or maleic anhydride and its derivatives.

The general formula of said sulfonic compounds is:

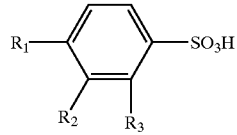

$R_1$, $R_2$, $R_3$=H or a $C_1$–$C_5$ alkyl.

Said phosphoric acid compound is one selected from polyphosphoric acid, phosphorous acid, modified polyphosphoric acid, and phosphate compounds, or a mixture thereof.

Said phenolic resin compound is one selected from formaldehyde alkylphenol resin compounds, wherein the alkyl is p-tert-butyl or p-tert-octyl paraffinic group. The polar hetero-atom containing alkyl is also desired, wherein said formaldehyde alkylphenol resin comprises formaldehyde phenol resin having sulfur or oxygen atom containing alkyl.

Said aldehyde compound is one selected from the group consisting of glycidic aldehyde, formaldehyde, binary aldehydes, and furfural, or a mixture thereof, wherein the binary aldehydes are p-phthalic aldehyde and its derivatives or m-phthalic aldehyde and its derivatives.

The function of adding organic polar compounds in the present system is to promote the reaction of the cross-linking reagent. The results of present invention shows that the addition of the organic polar compounds makes the asphalt and the polymer having double bonds form a continuous phase structure through the action of the organic polar compounds.

The modified asphalt composition prepared by the process provided by the present invention has good storage-stability, its softening point difference determined by the stability method being lower than 2.5° C. The preparation process provided by the present invention is simple and needs no special apparatus. The modified asphalt composition can be directly used in rainy and wet areas without using anti-stripping reagents to increase the adhesive capability between the stone and asphalt since it has a high viscosity, adhesives, and strong wrap ability for stone. The modified asphalt composition prepared by the process provided by the present invention can also be used as a basic raw material of emulsified asphalt, which may be realized by adding a certain proportion of water and an emulsifier.

The modified asphalt composition and the process provided by the present invention will be further illustrated below in combination with the examples, but the present invention is not limited thereby.

EXAMPLES

Base asphalts A and B used in the present invention were a straight-run asphalt and a asphalt by propane deasphalting, the properties of which are shown in Table 2. The SBS polymer was 1403 produced by Beijing Yanshan Petrochemical Co. The colloidal mill was FD3/60-20 produced by Shanghai Fluko Electromechanical Equipment Co. Stability test was made according to the method provided by ASTM D 5892-96a, and the softening point was determined according to the method provided by GB/T 4507.

Example 1

The present example illustrates the case wherein the modified asphalt composition was prepared by treating the base asphalt with the compatibilizer.

First, to 360 g of base asphalt A at 190° C. is added 120 g of acid-containing tall oil (produced by Liaoning Petrochemical Fiber Plant. the same below), and the mixture was mixed at 180° C. for 1 h. Then to the treated base asphalt A were added in sequence 90 g of SBS, 18 g of colloidal sulfur (produced by Maoming Petrochemical Co. the same below), and 12 g of maleic anhydride (produced by Lanzhou Chemical Industry Co., the same below), and the mixture was reacted at 120° C. for 6 h, yielding the modified asphalt composition, the properties of which are shown in Table 3. It can be seen from Table 3 that the softening point difference determined by the stability test is only 2° C.

Example 2

The present example illustrates the case wherein the modified asphalt composition was prepared by adding the compatibilizer twice.

First, to 360 g of base asphalt A at 190° C. is added 60 g of acid-containing tall oil, and the mixture was mixed at 180° C. for 1 h. Then to the treated base asphalt A were added in sequence 90 g of SBS, 18 g of colloidal sulfur, 12 g of maleic anhydride, and 60 g of acid-containing tall oil, and the mixture was reacted at 220° C. for 6 h, yielding the modified asphalt composition, the properties of which are shown in Table 3. It can be seen from Table 3 that the softening point difference determined by the stability test is only 2.5° C.

Example 3

The present example illustrates the case wherein the modified asphalt composition was prepared by treating the asphalt mother liquor with the compatibilizer.

Figure 1:
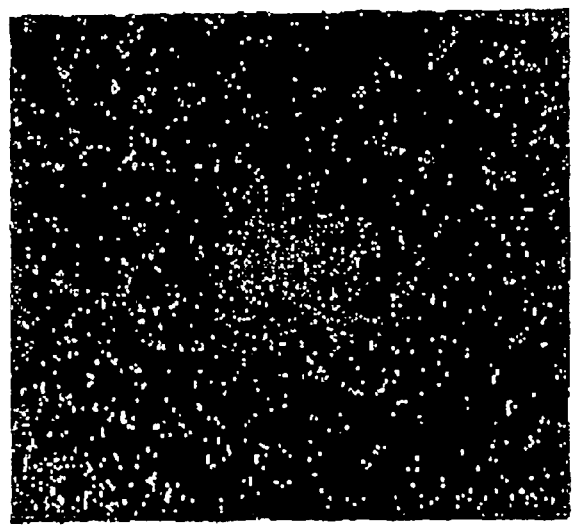
FIG. 1 is an electronic microscope image of a modified asphalt composition of one example of the present invention.
Figure 2:
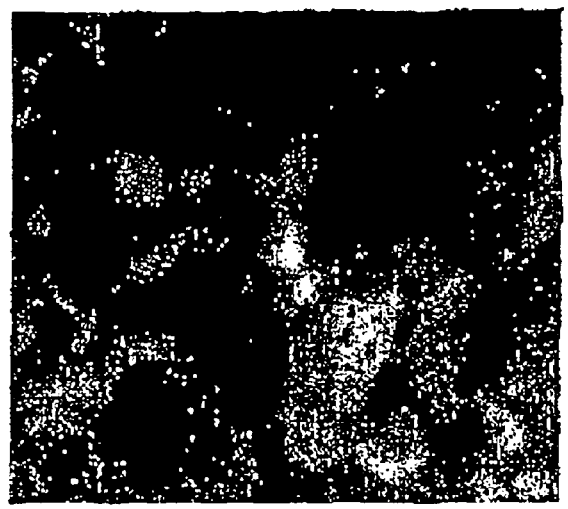
FIG. 2 is an electronic microscope image of a modified asphalt composition of one comparative example.

470.3 g of base asphalt A at 160° C. is mixed with 14.3 g of SBS for 2.0 h, yielding 484.6 g of an asphalt mother liquor. To the asphalt mother liquor at 120° C. was added 4.9 g of styrene tar, and the mixture was mixed at 180° C. for 0.5 h, yielding a treated asphalt mother liquor. To the treated asphalt mother liquor were added 0.5 g of cyclohptathioimine (produced by Lanzhou Chemical Industry Co., the same below) and 10 g of polyphosphoric acid (produced by Jilin Chemical Industry Co., the same below), and the mixture was reacted for 150 min, yielding the modified asphalt composition, the properties of which are shown in Table 3. The microstructure of the modified asphalt composition can be identified by the image of the microscope. It can be seen from Table 3 that the softening point difference determined by the stability test is only 1° C. FIG. 1 shows the SBS polymer distributed uniformly in the modified asphalt composition, and the polymer forming a continuous phase, that means the modified asphalt composition is very stable.

Comparative Example 1

Compared to Example 3, no organic polar compound is added in the present comparative example.

479.7 g of base asphalt A at 200° C. is mixed with 14.3 g of SBS for 0.5 b, yielding 494.0 g of an asphalt mother liquor. To the asphalt mother liquor at 120° C. was added 5.0 g of styrene tar, and the mixture was mixed at 200° C. for 0.5 h, yielding a treated asphalt mother liquor. To the treated asphalt mother liquor was added 0.5 g of cyclohptathioimine, and the mixture was reacted for 150 min, yielding the modified asphalt composition. The microstructure of the modified asphalt composition can be identified by the image of the microscope. Its properties are shown in Table 3. It can be seen from Table 3 that the softening point difference determined by the stability test is as high as 45° C. FIG. 1 shows the SBS polymer distributed in the modified asphalt composition in flocculation state; the asphalt forming a continuous phase, and the polymer having the tendency to aggregate, that means the modified asphalt composition is not stable.

Example 4

The present example illustrates the case wherein the modified asphalt composition was prepared by treating the asphalt mother liquor with the compatibilizer.

436.5 g, of base asphalt A at 150° C. is mixed with 13.5 g of SBS for 3.0 h, yielding 450 g of asphalt mother liquor. To the asphalt mother liquor at 150° C. was added 90 g of white oil, and the mixture was mixed at 150° C. for 0.5 h, yielding a treated asphalt mother liquor. To the treated asphalt mother liquor were added 30 g of zinc oxide (produced by Huangyan Chemical Plant, Jiangsu) and 30 g of hexamethylene diamine (produced by Lanzhou Chemical Industry Co.), and the mixture was reacted for 60 min, yielding the modified asphalt composition, the properties of which are shown in Table 4. It can be seen from Table 4 that the softening point difference determined by the stability test is only 0.5° C.

Example 5

The operation procedure, operation conditions, and the contents of various components in Example 5 are the same as those in Example 4, except that base asphalt A is replaced by base asphalt B. The properties of the prepared modified asphalt composition are shown in Table 4. It can be seen from Table 4 that the softening point difference determined by the stability test is only 0.5° C.

Example 6

The present example illustrates the case wherein the modified asphalt composition was prepared by adding the base asphalt twice.

379.8 g of base asphalt A at 180° C. is mixed with 14.7 g of SBS for 2.0 h, yielding 394.5 g of an asphalt mother liquor. To the asphalt mother liquor at 180° C. was added 2.5 g of catalytically cracked oil slurry, and the mixture was mixed at 180° C. for 0.5 h, yielding a treated asphalt mother liquor. To the treated asphalt mother liquor were added 5 g of disulfurized dimorfoline (produced by Jilin Chemical Industry Co.), 3 g of a mixture of polyphosphoric acid and glycidic aldehyde (produced by Jilin Chemical Industry Co.), and 95.0 g of base asphalt A, and the mixture was mixed at 180° C. for 0.5 h, yielding the modified asphalt composition. The properties of which are shown in Table 4. It can be seen from Table 4 that the softening point difference determined by the stability test is only 2° C.

Example 7

The present example illustrates the case wherein the modified asphalt composition was prepared by adding the compatibilizer at last.

474.8 g of base asphalt A at 185° C. is first mixed with 14.7 g of SBS for 2.0 h, yielding 489.5 g of an asphalt mother liquor. To the asphalt mother liquor at 180° C. was added in sequence a mixture of 5 g of disulfurized tetrabutyl thiuram (produced by Qingdao Chemical Plant, Shandong) and 3 g of p-toluenesulfonic acid (produced by Nanjing Huajing Group Co.), and 2.5 g of catalytically cracked oil slurry, and the mixture was mixed at 180° C. for 0.5 h, yielding the modified asphalt composition, the properties of which are shown in Table 4. It can be seen from Table 4 that the softening point difference determined by the stability test is only 1° C.

Example 8-11

Example 8-11 illustrate the case wherein the modified asphalt compositions were prepared by treating polymer having double bonds with different kinds of compatibilizers.

Example 8

A35 g of SBS was contacted with 75 g of the heavy deasphalted oil at 180° C. for 2 h, and then to the treated SBS were added 385 g of base asphalt A, 1.5 g colloidal sulfur and 3.5 g of maleic anhydride to react at 180° C. for 2 h, yielding a modified asphalt composition, the properties of which are shown in Table 5. It can be seen from Table 3 that the softening point difference determined by the stability test is only 2.5° C.

Example 9

15 g of SBS was contacted with 2.5 g of naphthenic oil at 25° C. for 48 h, and then to the treated SBS were added 479 g of base asphalt A, 1 g mono-sulfurized alkylphenol (produced by Beijing Chemical Plant) and 2.5 g of polyphosphoric acid produced by Beijing Chemical Plant) to react at 150° C. for 3 h, yielding a modified asphalt composition, the properties of which are shown in Table 5. It can be seen from Table 5 that the softening point difference determined by the stability test is only 2° C.

Example 10

15 g of SBS was contacted with 30 g of catalytically cracked oil slurry at 100° C. for 7 h, and then to the treated SBS were added 450 a of base asphalt B, 2.5 g zinc oxide (produced by Beijing Chemical Plant), and 2.5 g of phenyl formaldehyde (produced by Yanshan Petrochemical Co.) to react at 200° C. for 1 h, yielding a modified asphalt composition, the properties of which are shown in Table 5. It can be seen from Table S that the softening point difference determined by the stability test is only 1° C.

Example 11

75 g of SBS was contacted with 100 g of styrene tar at 150° C. for 2 h, and then to the treated SBS were added 275 g of base asphalt B, 25 g crystallized sulfur (produced by Beijing Chemical Plant.) and 25 g of phthalic anhydride (produce by Qingdao Chemical Plant, Shandong) to react at 170° C. for 2.5 h, yielding a modified asphalt composition, the properties of which are shown in Table 5. It can be seen from Table 5 that the softening point difference determined by the stability test is only 1° C.

TABLE 2

| Base asphalt | A | B |
|---|---|---|
| Penetration (25° C., 100 g, 5 s), dmm | 69 | 90 |
| Softening point (ring-and ball), ° C. | 48 | 47.5 |
| Ductility (15° C., 5 cm/min), cm | >150 | >150 |
| Viscosity (135° C.), centistokes | 732 | 455 |
| Adhesive toughness (25° C.), N.m | 4.3 | 3.2 |
| Saturates, wt % | 18.5 | 7.4 |
| Aromatics, wt % | 31.3 | 51.5 |
| Resin, wt % | 35.3 | 31.8 |
| Asphaltene, wt % | 14.9 | 9.3 |

TABLE 3

| No. | Ex. 1 | Ex. 2 | Ex. 3 | Comp. Ex. 1 |
|---|---|---|---|---|
| Base asphalt A, wt % | 60.0 | 60.0 | 94.06 | 96.04 |
| SBS, wt % | 15.0 | 15.0 | 2.86 | 2.86 |
| compatibilizer, wt % | 20.0 | 20.0 | 0.98 | 1.0 |
| Cross-linking reagent, wt % | 3.0 | 3.0 | 0.1 | 0.1 |
| Organic polar compound, wt % | 2.0 | 2.0 | 2.0 | 0 |
| Product properties | | | | |
| Penetration (25° C.), dmm | 50 | 52 | 67 | 65 |
| Softening point (ring-and-ball), ° C. | 86.2 | 88.8 | 58.5 | 55.5 |
| Ductility (5° C., 5 cm/min), cm | 43 | 38 | 35 | 38 |
| Stability test, ° C. | 2.0 | 2.5 | 1 | 45 |
| Viscosity (135° C.), centistokes | 2132 | 2003 | 980 | 1002 |
| Adhesive toughness (25° C.), N.m | 32.2 | 28.5 | 15.3 | 13.2 |
| Thin film oven (163° C., 5 h) | | | | |
| Ratio of Penetration, % | 92 | 94 | 67.5 | 68.4 |
| Ductility (5° C.), cm | 25 | 24.5 | 22 | 28 |

TABLE 4

| No. | Ex. 4 | Ex. 5 | Ex. 6 | Ex. 7 |
|---|---|---|---|---|
| Base asphalt, wt % | A/72.8 | A/94.06 | B/95.0 | B/95.0 |
| SBS, wt % | 2.2 | 2.91 | 2.9 | 2.9 |
| compatibilizer, wt % | 15.0 | 0.93 | 0.5 | 0.5 |
| Cross-linking reagent, wt % | 5.0 | 0.1 | 1.0 | 1.0 |
| Organic polar compound, wt % | 5.0 | 2 | 0.6 | 0.6 |
| Product properties | | | | |
| Penetration (25° C.), dmm | 95 | 83 | 62 | 61 |
| Softening point (ring-and-ball), ° C. | 58.5 | 61.5 | 76.3 | 78.4 |
| Ductility (5° C., 5 cm/min), cm | 86 | 64 | 54 | 48 |
| Stability test, ° C. | 0.5 | 0.5 | 2.0 | 1.0 |
| Viscosity (135° C.), centistokes | 992 | 1035 | 1532 | 1438 |
| Adhesive toughness (25° C.), N.m | 15.2 | 21.2 | 25.2 | 23.3 |
| Thin film oven (163° C., 5 h) | | | | |
| Ratio of Penetration, % | 78.5 | 82.1 | 76.1 | 75.4 |
| Ductility (5° C.), cm | 63 | 53 | 41 | 42 |

TABLE 5

| No. | Ex. 8 | Ex. 9 | Ex. 10 | Ex. 11 |
|---|---|---|---|---|
| Base asphalt, wt % | A/77 | A/95.8 | B/90 | B/55 |
| SBS, wt % | 7 | 3 | 3 | 15 |
| compatibilizer, wt % | 15 | 0.5 | 6 | 20 |
| Cross-linking reagent, wt % | 0.3 | 0.2 | 0.5 | 5 |
| Organic polar compound, wt % | 0.7 | 0.5 | 0.5 | 5 |
| Product properties | | | | |
| Penetration (25° C.), dmm | 45 | 60 | 85 | 75 |
| Softening point (ring-and-ball), ° C. | 92 | 58.5 | 56 | 74.3 |
| Ductility (5° C., 5 cm/min), cm | 65 | 42 | 53 | 54 |
| Stability test, ° C. | 2.5 | 2.0 | 1.0 | 1.0 |
| Viscosity (135° C.), centistokes | 1895 | 975 | 876 | 2658 |
| Adhesive toughness (25° C.), N.m | 31.2 | 16.8 | 14.2 | 33.5 |
| Thin Film Oven (163° C., 5 h) | | | | |
| Ratio of Penetration, % | 95.3 | 76.5 | 68.5 | 86.8 |
| Ductility (5° C.), cm | 46 | 31 | 36 | 35 |

What is claimed is:

1. A storage-stable modified asphalt composition, which comprises:
   base asphalt 50–97.7 parts by weight;
   polymer having double bonds 2.0–20.0 parts by weight;
   compatibilizer 0.1–20.0 parts by weight;
   cross-linking reagent 0.1–10.0 parts by weight, wherein said cross-linking reagent is one selected from the group consisting of crystallized sulfurs, activated sulfurs, sulfur-donors, "symbolizing" sulfur-donating cross-linking reagents, and a mixture thereof,
   organic polar compound 0.1–10.0 parts by weight,
   and the softening point difference of its product determined by the stability test is lower than 2.5° C.

2. The modified asphalt composition according to claim 1, wherein said base asphalt is one selected from the group consisting of petroleum asphalts, coal-tar asphalts, tar sand asphalts, and native asphalts, or a mixture thereof, wherein the petroleum asphalt is one selected from the group consisting of straight-run asphalts, asphalts obtained by solvent deasphalting, oxidized asphalts, blended asphalts, and a mixture thereof.

3. The modified asphalt composition according to claim 1, wherein said polymer having double bonds is a block polymer of styrene and butadiene in a ratio of 20–45:80–55.

4. The modified asphalt composition according to claim 1, wherein said compatibilizer is one selected from the group consisting of styrene tar, tall oil, acid-containing tall oil, catalytically cracked oil slurry, heavy deasphalted oil, extracted oil obtained by solvent refining, naphthenic acid, naphthenic oil, white oil, coal tar fractions, and a mixture thereof.

5. The modified asphalt composition according to claim 1, wherein said activated sulfur is a sulfur powder, a colloidal sulfur, or a mixture thereof, and said colloidal sulfur is a colloid with an average diameter of 1–5 µm prepared by mixing sulfur powder or precipitated sulfur with a dispersion reagent and then grinding.

6. The modified asphalt composition according to claim 1, wherein said sulfur donor is one selected from the group consisting of sulfur-containing morpholinium compounds, thiuram compounds, polysulfides, and a mixture thereof.

7. The modified asphalt composition according to claim 1, wherein said "symbolizing" sulfur-donating cross-linking reagent is a divalent metal oxide cross-linking reagent.

8. The modified asphalt composition according to claim 1, wherein said organic polar compound is one selected from the group consisting of amine, acid, phenolic resin, aldehyde compounds, and a mixture thereof.

9. The modified asphalt composition according to claim 8, wherein said amine compound is one selected from polyactene polyamine compounds, wherein the polyactene comprises di-, tri- and tetraethylene; and the polyamine comprises hexamethylene diamine, tetramine, penta-amine, or a mixture thereof.

10. The modified asphalt composition according to claim 8, wherein said acid compound is one selected from the group consisting of carboxylic acid, acid anhydride, sulfonic acid, boric acid, phosphoric acid compounds, and a mixture thereof.

11. The modified asphalt composition according to claim 10, wherein said phosphoric acid compound is one selected from the group consisting of polyphosphoric acid, phosphorous acid, modified phosphoric acid, phosphate compounds, and a mixture thereof.

12. The modified asphalt composition according to claim 8, wherein said phenolic resin compound is one selected from the group consisting of formaldehyde alkylphenol resin compounds, wherein the alkyl is p-tert-butyl or p-tert-octyl paraffinic group.

13. The modified asphalt composition according to claim 12, wherein said alkyl is the polar hetero-atom containing alkyl, and said formaldehyde alkylphenol resin comprises formaldehyde phenol resin having sulfur or oxygen atom containing alkyl.

14. The modified asphalt composition according to claim 8, wherein said aldehyde compound is one selected from the group consisting of glycidic aldehyde, formaldehyde, binary aldehydes, furfural, and a mixture thereof, wherein the binary aldehydes are p-phthalic aldehyde or m-phthalic aldehyde.

15. A process for preparing the storage-stable modified asphalt composition according to claim 1, which comprises mixing 50–97.7 parts by weight of a base asphalt, 2.0–20.0 parts by weight of a polymer having double bonds, 0.1–20.0 parts by weight of a compatibilizer, 0.1–10.0 parts by weight of a cross-linking reagent, and 0.1–10.0 parts by weight of a organic polar compound at 100 to 250° C. to react for 5 to 300 minuets, wherein said cross-linking reagent is one selected from the group consisting of crystallized sulfurs, activated sulfurs, sulfur-donors, "symbolizing" sulfur-donating cross-linking reagents, and a mixture thereof.

16. The process according to claim 15, wherein said compatibilizer can be first mixed with the base asphalt, or with the polymer having double bonds, or with the mixture of the polymer having double bonds and the base asphalt; or said compatibilizer can be added at last, and said compatibilizer can be added either once or twice.

17. The process according to claim 15, wherein said base asphalt can be added either once or twice.

18. The process according to claim 15, wherein said process comprises the following steps:
(1) contacting the base asphalt with the compatibilizer at 100° C.–250° C. for 0.1–6 h to yield the treated base asphalt;
(2) mixing the treated base asphalt with the polymer having double bonds for 0.1–10 h to yield the asphalt mother liquor;
(3) adding the cross-linking reagent, organic polar compound, and optional base asphalt to the asphalt mother liquor at 100° C.–250° C. to react for 5–300 min, yielding the modified asphalt composition;
wherein the weight ratio of the base asphalt in step (3) to that in step (1) is 0–50:100–50.

19. The process according to claim 15, wherein said process comprises the following steps:
(1) contacting the base asphalt with the compatibilizer at 100° C.–250° C. for 0.1–6 μl to yield the treated base asphalt;
(2) mixing the treated base asphalt with the polymer having double bonds for 0.1–10 h to yield the asphalt mother liquor, (3) adding the cross-linking reagent, organic polar compound, and optional compatibilizer to the asphalt mother liquor at 100° C.–250° C. to react for 5–300 mm, yielding the modified asphalt composition;
wherein the weight ratio of the compatibilizer in step (3) to that in step (1) is 0–50:100–50.

20. The process according to claim 15, wherein said process comprises the following steps:
(1) mixing the base asphalt at 100° C.–250° C. with the polymer having double bonds for 0.1–10 h to yield the asphalt mother liquor;
(2) contacting the asphalt mother liquor at 1 000C-250° C. with the compatibilizer at 100–250° C. for 0.1–6 h to yield the treated asphalt mother liquor;
(3) adding the cross-linking reagent, organic polar compound, and the optional base asphalt to the treated asphalt mother liquor to react for 5–300 min, yielding the modified asphalt composition;
wherein the weight ratio of the base asphalt in step (3) to that in step (1) is 0–50:100–50.

21. The process according to claim 15, wherein said process comprises the following steps:
(1) contacting 2.0–20.0 parts by weight of a polymer having double bonds with 0.1–20.0 parts by weight of a compatibilizer at 10° C.–250° C. for 0.1–72 h to yield the treated polymer having double bonds;
(2) heating 50–97.7 parts by weight of the base asphalt to 100° C.–250° C.;
(3) mixing the treated polymer having double bonds with the heated asphalt for 0.1–6.0 h to yield an asphalt mother liquor, and maintaining the temperature of the asphalt mother liquor at 100° C.–250° C.;
(4) adding 0.1–10.0 parts by weight of the cross-linking reagent and 0.1–10.0 parts by weight of the organic polar compound into the asphalt mother liquor to react for 5–300 min, yielding the modified asphalt composition.

22. The process according to any one of claims 15 to 21 wherein said base asphalt is one selected from the group consisting of petroleum asphalts, coal-tar asphalts, tar sand asphalts, and native asphalts, and a mixture thereof, wherein the petroleum asphalt is one selected from the group consisting of straight-rum asphalts, asphalts obtained by solvent deasphalting, oxidized asphalts, blended asphalts, and a mixture thereof.

23. The process according to any one of claims 15 to 21, wherein said polymer having double bonds is a block polymer of styrene and butadiene in a ratio of 20–45:80–55.

24. The process according to any one of claims 15 to 21, wherein said compatibilizer is one selected from the group consisting of styrene tar, tall oil, acid-containing tall oil, catalytically cracked oil slurry, heavy deasphalted oil, extracted oil obtained by solvent refining, naphthenic acid, naphthenic oil, white oil, coal tar fractions and a mixture thereof.

25. The process according to claim 15, wherein said activated sulfur is a sulfur powder, a colloidal sulfur, or a mixture thereof, and said colloidal sulfur is a colloid with an average diameter of 1–5 μm prepared by mixing sulfur powder or precipitated sulfur with a dispersion reagent and then grinding.

26. The process according to claim 25, wherein said sulfur donor is one selected from the group consisting of sulfur-containing morpholinium compounds, thiuram compounds, polysulfides and a mixture thereof.

27. The process according to claim 15, wherein said "symbolizing" sulfur-donating cross-linking reagent is a divalent metal oxide cross-linking reagent.

28. The process according to any one of claims 15 and 18 to 21, wherein said organic polar compound is one selected from the group consisting of amine, acid, phenolic resin, aldehyde compounds, and a mixture thereof.

29. The process according to claim 28, wherein said amine compound is one selected from polyactene polyamine compounds, wherein the polyactene comprises di-, tri- and tetraethylene; and the polyamine comprises hexamethylene diamine, tetramine, penta-amine, or a mixture thereof.

30. The process according to claim 28, wherein said acid compound is one selected from the group consisting of carboxylic acid, acid anhydride, sulfonic acid, boric acid, phosphoric acid compounds, and a mixture thereof.

31. The process according to claim 30, wherein said phosphoric acid compound is one selected from the group consisting of polyphosphoric acid, phosphorous acid, modified phosphoric acid, phosphate compounds, and a mixture thereof.

32. The process according to claim 28, wherein said phenolic resin compound is one selected from formaldehyde alkylphenol resin compounds, wherein the alkyl is p-tert-butyl or p-tert-octyl paraffinic group.

33. The process according to claim 32, wherein said alkyl is the polar hetero-atom containing alkyl, and said formaldehyde alkylphenol resin comprises formaldehyde phenol resin having sulfur or oxygen atom containing alkyl.

34. The process according to claim 28, wherein said aldehyde compound is one selected from the group consisting of glycidic aldehyde, formaldehyde, binary aldehydes, furfural, and a mixture thereof, wherein the binary aldehydes are p-phthalic aldehyde or m-phthalic aldehyde.

* * * * *